United States Patent Office 3,098,762
Patented July 23, 1963

3,098,762
PROCESS FOR IMPROVING DIFFUSION ELECTRODES
Leland H. S. Roblee, Jr., Metuchen, John V. Clarke, Jr., Cranford, and Charles W. Foust, Berkeley Heights, N.J., assignors to Esso Research and Engineering Company, a corporation of Delaware
No Drawing. Filed July 3, 1961, Ser. No. 121,345
4 Claims. (Cl. 117—228)

This invention relates to improvements in electrodes for electrochemical cells. In particular, this invention relates to an improved method for surface conditioning diffusion type electrodes which are designed to provide high areas of contact per unit volume between an aqueous electrolyte and a non-aqueous fluid reactant upon an electron conductive surface. More particularly, this invention relates to a novel process for improving gas diffusion electrodes by establishing a durable hydrophobic surface upon the walls of pores through which a reactant gas is admitted into dual contact with the electrode and an aqueous electrolyte.

This invention is concerned with the problem of electrode flooding in fuel cells and especially with the cathode or oxygen electrode of such cells the gas passages of which tend to become hydrophilic after continued contact with the oxidant feed stream. The usefulness of the invention, however, is not confined to such cathodes although they present the greater problem and may be advantageously employed with the diffusion type anode or fuel electrode of such cells or with anodes employed for a similar purpose in electrolytic cells.

Electrochemical cells wherein the chemical energy of a combustible fuel is converted directly into electrical energy have become known in the art as fuel cells. The over-all fuel cell reaction is the sum of two essentially independent half-cell reactions. At the anodes, hydrogen, carbon monoxide, or a carbonaceous fuel, e.g., hydrocarbons and oxygenated hydrocarbons, is electrochemically oxidized with a release of electrons to the anode. At the cathode, oxygen is reduced with the acceptance of electrons to form hydroxyl ions, perhydroxyl ions, or water, depending upon the electrolyte employed and other reaction conditions. The internal portion of the electrical circuit is completed by ion transfer through an electrolyte between such electrodes while electron transfer from anode to cathode completes the external portion of the circuit. In those systems employing a gaseous oxidant it is necessary to establish between the oxidant gas, the aqueous electrolyte, and the conductive cathode a three-phase contact. The oxidant most often employed is pure oxygen gas, air, or mixtures of oxygen with an inert gas. Electrolytic cells, activated by an external source of direct current are also employed to effect anodic oxidation of organic feedstocks. However, such cells do not need to employ a diffusion cathode requiring only an electrolyte resistant conductor for such cathode.

When the fuel employed, i.e., the substance which undergoes electrochemical oxidation, is immiscible with the electrolyte or where for any reason it is desirable to introduce such fuel directly to the anode before admission to the electrolyte a gas or liquid diffusion anode is employed for bringing such fuel into dual contact with the anode and the electrolyte in much the same manner as with the oxygen at the cathode. This use is equally applicable whether the anode is employed in a power producing fuel cell or a power driven electrolytic cell.

It now has been discovered that the effectiveness of diffusion type electrodes for the uses hereinbefore described can be surprisingly improved by resurfacing the passages to be occupied by the non-aqueous reactant by reacting low molecular weight silanes with the existing surfaces in accordance with the process hereinafter described in detail.

The ideal structure for a diffusion electrode consists of a porous material possessing a dual porosity, i.e., a series of larger pores intersected by a large number of smaller pores. In operation of the cell the small pores are filled with the aqueous electrolyte by capillary pressure. The non-aqueous fluid reactant, e.g., oxygen gas, fills such larger pores to near the external limits of the electrode which is in contact with the main body of the electrolyte and at these points and at the points of intersection between the smaller electrolyte pores and the larger gas filled pores the requisite three-component or three-phase contact is established. The electrode is ordinarily impregnated with a metal or metal comprising catalyst so as to provide catalyst at such points of intersection. The large pores aforementioned preferably have an average pore diameter in the range of about $0.2 \times 10^4$ to $2 \times 10^5$ A. while the bulk of the pore volume provided by the smaller pores is provided by pores having an average diameter in the range of about 50 to 400 A. Porous carbon has proven one of the most satisfactory materials for this purpose and will be used herein to illustrate the invention. However, the process of this invention may be used with any diffusion type electrode wherein the electrode base possesses chemically active elements or functional groups on the gas passage surfaces thereof that will react with the silane compounds herein employed.

If the gas passages are allowed to become hydrophilic aqueous electrolyte enters these passages as well as the smaller pores so as to either reduce or completely eliminate the requisite three-phase contacts which constitute the reaction sites. This problem creates the need for "wet proofing" the gas passages. This need has been recognized in the art and various methods have been employed to solve the problem. Among the first such efforts was the use of paraffin wax which unfortunately melts at relatively low temperatures and presents problems of pore clogging. Later high molecular weight polymers have been used with greater success. Certain polymers such as polyethylene or polytetrafluoroethylene have been associated with the pore surfaces by polymerization in situ and by electrodeposition of minute polymeric particles. Although such methods of application are among the best available in the art, they require either special polymerization catalysts or electrodeposition equipment and certain controls must be observed to obtain a uniform coating of the desired thickness while avoiding pore clogging.

In the present process a silane compound containing a readily reactive functional group, e.g., —Cl, is reacted with functional groups, e.g. —OH, —COOH, etc., bonded to the pore surface so as to bond such silane compound to the pore wall and with water upon the surface being treated to provide lateral bonding

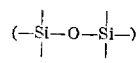

in the resulting film. The silanes employes are monomeric in nature, preferably include only one silicon atom per molecule and one to three chlorine atoms or other reactive groups bonded to such silicon atom.

These reactions are known in the art. The present invention relates to a novel method for utilizing such reactions to provide a uniform silicon film upon the walls of passages of diffusion type electrodes through which non-aqueous reactants pass.

The preferred silane compounds for use in this invention are the organo-substituted chlorosilanes. These include monoalkyldichlorosilanes wherein the remaining silicon valence is substituted with hydrogen, e.g., methyldichlorosilane; monoalkyltrichlorosilanes, e.g., ethyltrichlorosilane, dialkyldichlorosilanes, e.g., dimethyldichlorosilane; and trialkylchlorosilanes, e.g., trimethylchlorosilane. The silane treating vapors may contain an individual compound of this group or a mixture of two or more of the same. Other materials that may be advantageously employed include the mono-, di-, and trichlorosilanes wherein the remaining silicon valences are satisfied with hydrogen and the organosilane esters of alkylchlorosilanes. These esters in many reactions follow the same pattern as the alkyl-substituted chlorosilanes aforementioned and the Si—OR bond can be hydrolyzed to the Si—O linkage by standard methods. Preferably, the silanes employed are those having a boiling point below that of water.

To avoid unnecessary duplication the silicon-containing compound employed as a reactant in this process, unless specifically named, will be referred to merely as a "silane."

The process of this invention comprises blocking the pores of a predetermined diameter size and below and then passing vapors of a volatile silane compound through the remaining pores of such electrode, e.g., those having an average diameter above the predetermined minimum. Preferably, the pores to be coated have been pretreated with water or water vapor so as to leave an aqueous film upon the pore walls to react with the silane vapors.

The small pores are blocked or removed from the area of reaction by filling such pores with a liquid in which the silane is relatively insoluble and unreactive. Saturated hydrocarbons, e.g., a $C_5$ to $C_8$ paraffin such as hexane, heptane, etc., are particularly suitable for this purpose. The selective blocking of pores may be effected by immersing the porous structure in the liquid hydrocarbon allowing the hydrocarbon to enter and occupy the pores or voids therein. The electrode may then be blown with air or an inert gas to preferentially remove the hydrocarbon from the larger pores. Since the capillary forces holding the hydrocarbon are inversely proportional to the size of pore the largest pores are thus evacuated first. Hence, the establishment of a predetermined pore size for blocking can be achieved by routine preliminary experimentation with the electrodes to be treated, e.g., by measuring the pore sizes and pore size distribution and then measuring the length of time required to evacuate those pores above a desired diameter at a constant blowing pressure. To determine when the desired pores are evacuated so as to establish a blowing time for electrodes of similar pore size distribution, a representative of the lot may be weighed before and after air blowing. From the difference in weight and the aforementioned measurements of pore size distribution the optimum blowing time for a given blowing pressure can be determined. Other methods known in the art may also be used such as filling the pores with an inert gas and controlling the pressure so that only the smaller pores, i.e., those having a capillary attraction sufficient to overcome the gas pressure, are filled with the hydrocarbon.

The electrode is then ready for water treating of the pores to be coated. This is preferably carried out by passing a gas, e.g., air, saturated with water vapor through such pores for a time sufficient to permit the formation of an aqueous film on the pore walls, e.g., of a thickness of 1 to 100–200 molecules or greater. For example, air may be passed through a bubbler where it is saturated with water and then allowed to flow through the evacuated pores of the electrode for about 5 to 10 minutes at a moderate pressure, e.g., 5–10 p.s.i.g. Steam treatment may be used in the alternative or other means of diffusion humidification.

The silane in vapor state is then carried through the water treated pores of the electrode preferably in a stream of dry nitrogen or other dry-inert gas where it reacts with the absorbed water and with oxygenated groups, e.g., hydroxyl and carboxyl groups, bonded to the carbon surface. Such groups are common to carbon surfaces and especially to those that have been oxidized to obtain the desired porosity or treated with oxygen to facilitate catalyst impregnation from an aqueous solution. In such a reaction a continuous polymeric silicone film is formed over the walls of the larger pores. This treatment is carried out at a temperature in the range of about 60° to 200° F., preferably about 68° to 95° F., e.g., at room temperatures employing the methylchlorosilanes. A preferred treatment range suitable for use with a variety of these silanes including the methylchlorosilane is between about 60° and 95° F. The amount of silanes laid down may be controlled by various methods. For instance the concentration of the silane in the gas stream can be controlled as can the time of exposure to such stream. The amount of water in the pores also can be controlled. Thus, if silane is employed in an amount insufficient to react with all of the water and the aforementioned surface groups then the reaction will proceed only to the extent that such silane is available. If, on the other hand, all of the water in such pores is caused to react and the surface groups are satisfied further amounts of silane vapor admitted to such pores will pass on out of the system. In view of the molecular diameters of such silanes, e.g., below about 10 A., this vapor state treatment permits the establishment of an effective continuous film from 1 to 100–200 molecules in thickness or greater without producing any significant decrease in pore volume. Thus, in a typical carbon electrode used in fuel cells wherein the mean diameter of the gas passages is about 20,000 A. a 100 molecule thickness (based on the monomer) of silicone polymer would reduce the pore volume only about 5%. For example, when a methylchlorosilane vapor is passed through such pores there occurs a rapid reaction of methylchlorosilane vapor with hydroxyl groups or adsorbed water on a surface to deposit a very thin film of methylpolysiloxane, thus changing the contact angle of that surface to a liquid.

After the silane treatment the electrode is heated at a temperature in the range of about 300° to 425° F., preferably 350° to 400° F., for a short time, i.e. a time sufficient to remove the liquid hydrocarbon, e.g. heptane, from the small pores. Heating at these temperatures also has the advantage of causing a rapid vaporization of the heptane which removes polymeric film which may have formed over the mouths of the smaller pores where they intersect the larger pores. Prolonged heating at temperatures above about 350° F. adversely affects the film.

The films thus formed are quite durable and are capable of withstanding prolonged electrode operations up to temperatures of 300° F. and above. They are suitable for use in electrochemical cells employing the conventional acidic electrolytes, e.g. $H_2SO_4$, $HNO_3$, $H_3PO_4$, etc., or carbonate-bicarbonate mixtures.

The invention will be more fully understood from the following example which illustrates one embodiment of the invention and should not be construed as a limitation upon the true scope of the invention as set forth in the claims.

EXAMPLE I

Two porous carbon electrodes in the form of a hollow cylinder with one closed end were burned out to a porosity of about 30% in $CO_2$ at about 1832° F. for 6 hours. The dimensions of the structures were as follows: Outside diameter ¾", length 1¾", inner cavity ⅜" in diameter drilled to ¼" from the closed end. After the burn out the electrodes were impregnated with a platinum and gold catalyst from an aqueous solution containing about 2 wt. percent total metal in the form of chloroplatinic acid and auric chloride in a ratio of about 95 parts platinum to 5 parts gold. Impregnation was by conventional techniques wherein the electrode was soaked in said solution, heated to decompose the absorbed material and then reduced under hydrogen at elevated temperatures.

One of these electrodes was then immersed in heptane and the heptane allowed to fill the pores thereof. The electrode was then air blown until the heptane had been removed from the larger pores, e.g. air at 5 p.s.i.g. was blown through the structure for about 5 minutes. Air saturated with water vapor was then passed through the evacuated pores for about 10 minutes. A stream of nitrogen containing vapors of dimethylidchlorosilane was then passed through the water treated pores for about 5 minutes. All of the foregoing was carried out at room temperature, e.g. about 68°–75° F. The electrode was then heated to a temperature of about 400° F. for about 1 hour to drive out the heptane and open any of the mouths of the smaller untreated pores that might have been blocked at the intersection with the larger pores by the silicone film formed in the larger pores.

This electrode and the untreated control were tested as the oxygen electrode (cathode) of a hydrogen-oxygen fuel cell employing an aqueous 30 wt. percent sulfuric acid electrolyte. The comparative results of these runs are set forth in the following table.

*Table I*

EFFECT OF SILANE TREATMENT OF OXYGEN ELECTRODE

| Electrode | Polarization, volts vs. theoretical $O^2$ at indicated current density, Amps./Ft.$^2$ | | | |
|---|---|---|---|---|
| | 0 | 10 | 30 | 50 |
| Silane treated: | | | | |
| Initial perf. | 0.45 | 0.60 | 0.73 | 0.84 |
| After 80 hrs. cont. operation at 0.2 amps. | 0.33 | 0.52 | 0.63 | 0.71 |
| Control: | | | | |
| Initial perf. | 0.46 | 0.62 | 0.75 | 0.84 |
| After 80 hrs. cont. operation at 0.2 amps. | 0.38 | 0.68 | 0.94 | 1.11 |

Thus the treated electrode demonstrated a marked performance superiority over the control after continued operation of 80 hours. At a current density of 50 amps./ft.$^2$ the increase in polarization from 0.84 to 1.11 is a substantial difference of 0.4 volt, a factor of major significance in the operation of cells of this type.

The treated electrode was further tested as a fuel electrode in a hydrogen-oxygen cell and gave no evidence of flooding. As aforementioned the problem of flooding is more prevalent and severe at the oxygen electrode and a wet-proofing treatment satisfactory for use at such electrode would ordinarily more than meet the wetproofing requirements at the anode.

What is claimed is:

1. A process for improving a porous carbon electrode having major pores whose average diameter is above about $0.2 \times 10^4$ A. and minor pores of lesser average diameter for use in a fuel cell employing an aqueous acidic electrolyte and oxygen gas so as to bring said electrode, said electrolyte and said gas into three phase contact, which comprises flooding said electrode with a $C_6$ to $C_7$ liquid paraffin, selectively removing said paraffin from said major pores by air blowing of said electrode, passing water vapor through said major pores and adsorbing a film of water thereon, passing an essentially anhydrous stream of nitrogen containing an alkylchlorosilane compound through said major pores until essentially all of said film has reacted with said compound leaving a continuous silicone film bonded to the walls of said major pores and rapidly heating said electrode to about 350° to 400° F. until said paraffin is removed from said minor pores.

2. A process in accordance with claim 1 wherein said silicone film has thickness in the range of about 10 to 1000 A.

3. A process in accordance with claim 1 wherein said paraffin is heptane.

4. A process in accordance with claim 1 wherein the thickness of said silicone film is controlled by controlling the amount of water adsorbed in said major pores.

References Cited in the file of this patent

UNITED STATES PATENTS

| | | |
|---|---|---|
| 356,727 | Perry | Jan. 25, 1887 |
| 1,601,036 | Nyberg | Sept. 28, 1926 |
| 2,306,222 | Patnode | Dec. 22, 1942 |
| 2,520,651 | Oswald | Aug. 29, 1950 |
| 2,767,519 | Bjorksten | Oct. 23, 1956 |
| 2,925,357 | Kothen | Feb. 16, 1960 |
| 2,942,050 | Denes | June 21, 1960 |
| 3,032,434 | Archibald | May 1, 1962 |